(12) United States Patent
Hashimoto

(10) Patent No.: US 6,765,360 B1
(45) Date of Patent: Jul. 20, 2004

(54) DYNAMIC OPTIMIZING METHOD FOR SPEED DATA AND POSITIONING DEVICE USING THIS METHOD

(75) Inventor: Youichi Hashimoto, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 10/088,094

(22) PCT Filed: Sep. 4, 2000

(86) PCT No.: PCT/JP00/06004

§ 371 (c)(1),
(2), (4) Date: Jun. 13, 2002

(87) PCT Pub. No.: WO01/22184

PCT Pub. Date: Mar. 29, 2001

(30) Foreign Application Priority Data

Sep. 21, 1999 (JP) .......................... 11-267547

(51) Int. Cl.[7] ............................................. G05B 13/00
(52) U.S. Cl. ..................... 318/561; 318/560; 318/618; 318/632
(58) Field of Search ................................ 318/560–569, 318/600–616, 466–470, 573, 632, 638, 652, 661, 692, 623, 671, 687; 700/169, 83, 189, 252, 261

(56) References Cited

U.S. PATENT DOCUMENTS

| | | | |
|---|---|---|---|
| 4,469,993 A | * | 9/1984 | Swanson et al. ............. 318/561 |
| 4,751,441 A | * | 6/1988 | Lewis ......................... 318/439 |
| 4,831,315 A | * | 5/1989 | Hammond et al. ........... 318/567 |
| 4,968,923 A | * | 11/1990 | Busujima ..................... 318/560 |
| 6,571,138 B1 | * | 5/2003 | Okada et al. .................. 700/83 |

OTHER PUBLICATIONS

Patent Abstracts of Japan, Publication No. 02–126307, dated May 15, 1990.
Patent Abstracts of Japan, Publication No. 03–231317, dated Oct. 15, 1991.
Patent Abstracts of Japan, Publication No. 05–250039, dated Sep. 28, 1993.
Patent Abstracts of Japan, Publication No. 07–306708, dated Nov. 21, 1995.
Patent Abstracts of Japan, Publication No. 2000–047719, dated Feb. 18, 2000.

* cited by examiner

*Primary Examiner*—Robert Nappi
*Assistant Examiner*—Renata McCloud
(74) *Attorney, Agent, or Firm*—Westerman, Hattori, Daniels & Adrian, LLP

(57) ABSTRACT

A dynamic optimization method for speed data, for compensating for a speed data maximum value and a minimum resolution that can be specified by users without depending on a speed pattern preparation cycle. A dynamic optimizing method for speed data used for preparing a speed instruction pattern fed to a motor in a positioning device, wherein a speed pattern generator (1) that calculates a desired speed pattern when a moving instruction (2) such as a moving distance, speed, acceleration time and deceleration time is input is provided, and a speed pattern preparation cycle (3) can be specified by users without the possibility that speed data maximum value and a minimum resolution of speed data are modified.

3 Claims, 3 Drawing Sheets

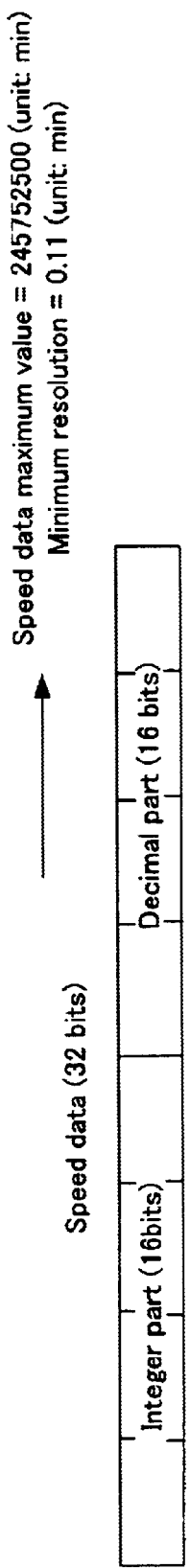
Fig. 2(a)  When the speed pattern preparation cycle is 8m sec:
Speed data maximum value = 245752500 (unit: min)
Minimum resolution = 0.11 (unit: min)
Speed data (32 bits)
Integer part (16bits) | Decimal part (16 bits)
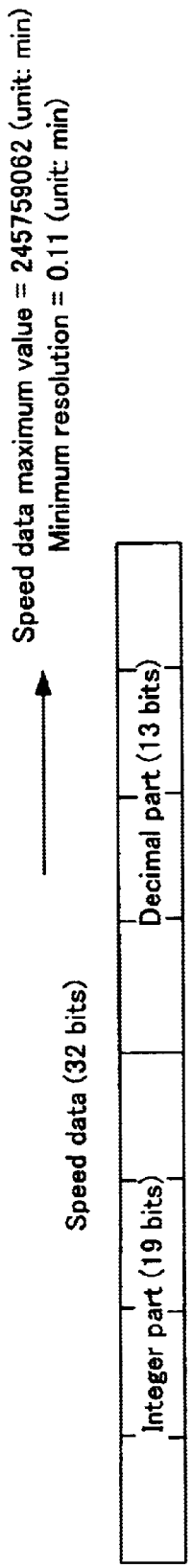
Fig. 2(b)  When the speed pattern preparation cycle is 64m sec:
Speed data maximum value = 245759062 (unit: min)
Minimum resolution = 0.11 (unit: min)
Speed data (32 bits)
Integer part (19 bits) | Decimal part (13 bits)

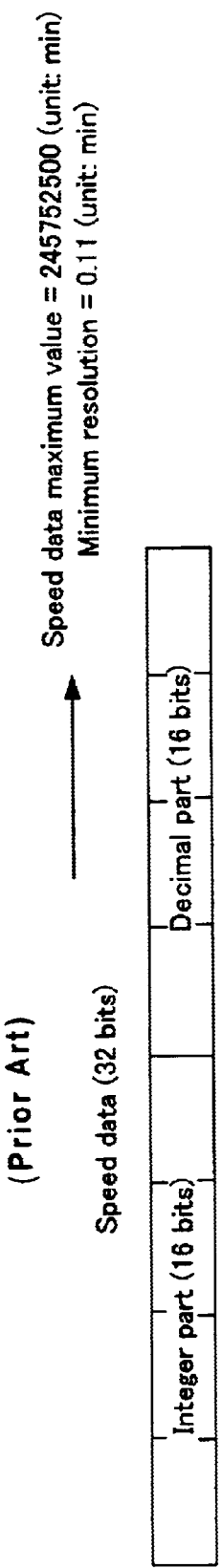
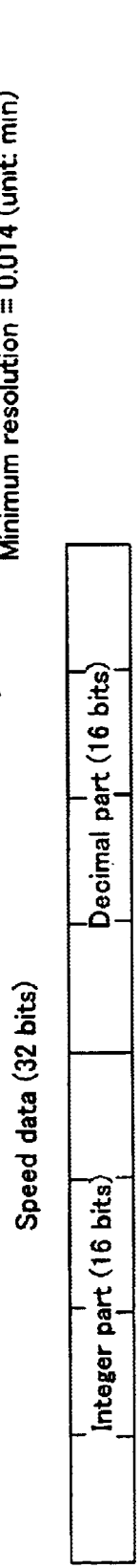
Fig. 3(a) When the speed pattern preparation cycle is 8m sec:
(Prior Art)
Speed data maximum value = 245752500 (unit: min)
Minimum resolution = 0.11 (unit: min)
Fig. 3(b) When the speed pattern preparation cycle is 64m sec:
(Prior Art)
Speed data maximum value = 30719062 (unit: min)
Minimum resolution = 0.014 (unit: min)

DYNAMIC OPTIMIZING METHOD FOR SPEED DATA AND POSITIONING DEVICE USING THIS METHOD

TECHNICAL FIELD

The present invention relates to a method for preparing a speed instruction pattern for a servo motor in a positioning device.

BACKGROUND ART

Conventionally, to prepare a speed pattern in a positioning device (CPU, controllers, servo amplifiers, and the like), the speed pattern preparation cycle and speed data are set as shown in FIGS. 3(a) and 3(b), that is, speed data is set to 32 bits in both FIG. 3(a) and FIG. 3(b), and by means of the fixed decimal mode, 16 bits are set for the integer part and 16 bits are set for the decimal part to fix the decimal point position. The speed pattern preparation cycle as a cycle for outputting speed data is set to 8 m sec in the case of FIG. 3(a) and 64 m sec in the case of FIG. 3(b).

In the case of FIG. 3(a). the speed data maximum value is 245752500 (unit: min) and the minimum resolution is 0.11 (unit: min), on the other hand, in FIG. 3(b), the speed lowers and the resolution increases to a degree at which the speed data maximum value is 30719062 (unit: min) and the minimum resolution is 0.014 (unit: min).

Thus, the speed minimum resolution to be used inside the a positioning device has conventionally been set to a fixed value of 0.11 (unit: min) in FIG. 3(a) and 0.014 (unit: min) in FIG. 3(b) based on a speed pattern preparation cycle, speed unit specified by a user, and speed data maximum value specified by the user.

However, in the abovementioned conventional example, the larger the speed data maximum value, the larger the minimum resolution, and the smaller the minimum resolution, the smaller the speed data maximum value. Therefore, when the speed pattern preparation period of the positioning device is changed, the minimum resolution changes, and when the speed resolution becomes insufficient due to the speed unit specified by a user and speed data maximum value specified by the user, the speed data maximum value is limited.

Therefore, an object of the invention is to provide a dynamic optimizing method for speed data, which does not fix the resolution of speed data to be used inside a positioning device, but distinguishes a dynamic optimum resolution, and in accordance with various speed pattern preparation cycles, user specified speed units, and speed data maximum values and minimum resolutions, can provide an environment which guarantees constant accuracy in a speed pattern determined by the user.

Furthermore, another object of the invention is to provide a positioning device using this method.

DISCLOSURE OF INVENTION

In order to solve the abovementioned problem, the present invention provides a dynamic optimizing method for speed data used for preparing a speed instruction pattern fed to a servo motor in a positioning device, characterized in that a speed pattern generator is provided, which calculates a desired speed pattern when a moving distance, speed, acceleration time, and deceleration time are inputted, a speed pattern preparation cycle can be specified by a user without a possibility that the speed data maximum value and minimum resolution of the speed data are modified.

According to a first aspect of the invention, the dynamic optimizing method for speed data is characterized in that a combination of a speed data maximum value and a minimum resolution can be selected by a user.

In addition, when a user specifies the speed pattern preparation cycle, the speed data maximum value and minimum resolution are prevented from changing by shifting the decimal part of the speed data to the right or left.

Furthermore, a positioning device using a servo motor comprises a moving instruction input unit, a speed pattern preparation unit for inputting a moving instruction from this moving instruction input unit, a speed instruction unit for outputting a speed instruction based on a speed instruction pattern from the speed pattern preparation unit in accordance with the speed instruction cycle specified by a user, and a servo control unit for driving the servo motor based on the speed instruction from this speed instruction unit.

According to this dynamic optimizing method for speed data, even when the speed pattern preparation cycle is dynamically changed, the speed data maximum value and minimum resolution are not influenced by this change, so that it becomes unnecessary to change a user program even when a user changes the speed pattern preparation cycle.

BRIEF DESCRIPTION OF THE DRAWINGS

FIG. 2 are drawings showing speed data prepared by the speed pattern preparation unit of FIG. 1; and FIG. 3 are drawings showing conventional speed data.

BEST MODE FOR CARRYING OUT THE INVENTION

Figure 1:
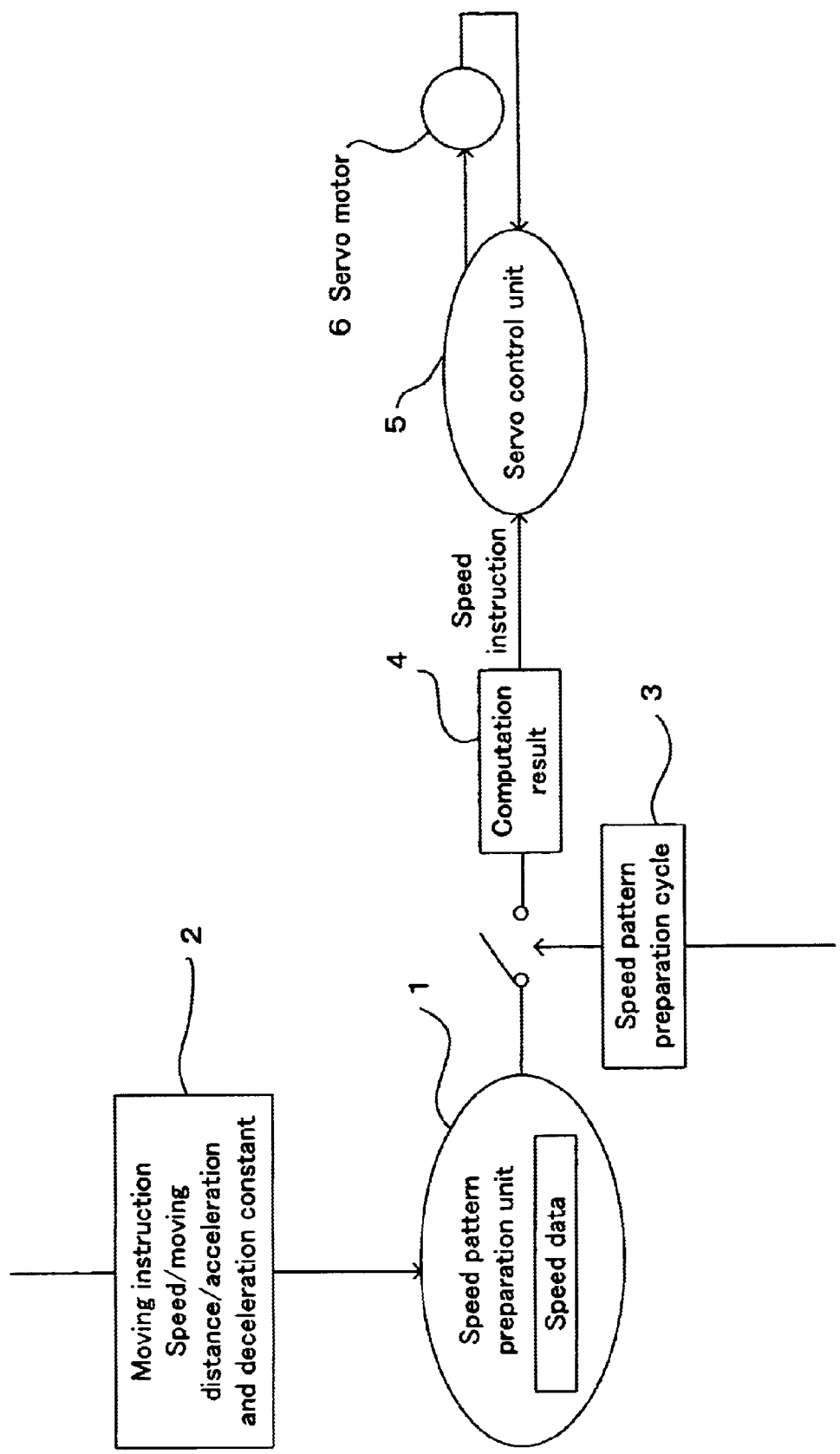
FIG. 1 is a conceptual diagram of program execution processing of a positioning device relating to an embodiment of the invention.

Hereinafter, an embodiment of the invention is explained with reference to the drawings.

In FIG. 1, the speed pattern preparation unit 1 is a controller comprising a CPU module and a motion module for a positioning device. The moving instruction 2 is to be inputted into the speed pattern preparation unit 1, and includes a speed, moving distance, and acceleration and deceleration constant (S-shaped pattern). The speed pattern preparation cycle 3 indicates a cycle (scanning cycle 8 ms through 64 ms) of a speed instruction outputted by the positioning device, and is specified by a user. The computation result 4 (speed instruction unit) is based on the speed pattern preparation unit 1, and outputs a speed instruction in each cycle based on the prepared speed pattern. The servo control unit 5 drives the servo motor 6 based on the speed instruction, and controls the motor position and speed.

Next, operations are explained.

The speed pattern preparation unit 1 calculates a speed pattern based on the inputted speed pattern preparation cycle 3 and moving instruction (moving distance and acceleration and deceleration time) 2, and the size of the computing range in this case is set to have a fixed length inside the positioning device. In this computing range with a fixed length, as shown in FIGS. 2(a) and 2(b) show examples in which the speed data size is 32 bits.

The fixed decimal mode is characterized in that the sum of significant digits of the integer part and significant digits of the decimal part from the fixed decimal point position are always fixed, so that under the same speed pattern preparation cycle condition, if the integer part is taken to be large, the decimal part becomes small, and the resolution lowers.

On the contrary, if the decimal part is taken to be large, the integer part becomes small, and the integer output range is reduced.

When the speed pattern preparation cycle 3 is fixed, for example, as shown in FIG. 2(a) and FIG. 3(a), and when the speed pattern preparation cycle 3 is 8 ms and the speed is the same, that is, the speed is constant, the integer part and decimal part can be fixed at an optimum ratio, for example, an integer part is fixed to be 16 bits and the decimal part is fixed to be 16 bits. However, when the speed pattern preparation cycle is dynamically changed, if the ratio of the integer part and the decimal part is fixed, the speed pattern preparation cycle influences the speed pattern resolution and speed data maximum value, so that it is necessary to modify the user program for each change in the speed pattern preparation cycle. That is, in the example of FIG. 3, when the speed pattern preparation cycle changes from 8 ms to 64 ms as shown in FIG. 3(b), it is necessary to modify the program based on the corresponding ratio of the speed data maximum value and minimum resolution of FIG. 3(a).

Therefore, the invention is constructed so that, as shown in FIG. 2(b), even when the speed pattern preparation cycle 3 is changed to 64 ms, the decimal part is shifted to the right to prevent the integer part of 19 bits, decimal part of 13 bits, speed data maximum value, and minimum resolution from changing, wherein by shifting the decimal part to the right or left, even when the speed pattern preparation cycle is changed, the speed data maximum value and minimum resolution do not change, and this makes modification of the user program unnecessary.

Furthermore, this combination of the speed data maximum value and minimum resolution is arranged so as to be set when inputting the moving instruction 2 and selected by a user, the positioning device shifts the decimal part of the speed data in accordance with the speed pattern preparation cycle so as to prevent the specified inputted speed data maximum value and minimum resolution from changing, so that a user can select an optimum data holding method, and can efficiently utilize controller resources in program preparation, look-ahead, and analysis.

Comparison with the floating decimal mode in which the decimal point position is variable makes no sense since the fixed decimal mode and floating decimal mode are different from each other in data structure and characteristics.

As described above, according to the invention, a dynamic optimizing method for speed data used for preparing a speed instruction pattern fed to a servo motor in a positioning device is characterized in that a speed pattern generator for calculating a desired speed pattern when a moving distance, speed, acceleration time, and deceleration time are inputted, the speed pattern preparation cycle can be specified by a user without a possibility of modifying the speed data maximum value and minimum resolution of the speed data. Therefore, even when the speed pattern preparation cycle is changed, compensation is carried out so as to prevent the speed data maximum value and minimum resolution of the speed data from changing, the combination of the speed data maximum value and minimum resolution can be selected by a user, and furthermore, when a user specifies the speed pattern preparation cycle, by shifting the decimal part of the speed data to the right or left, the speed data maximum value and minimum resolution can be prevented from changing. Accordingly, it is unnecessary for a user to modify the user program even when the user changes the speed pattern preparation cycle.

Industrial Applicability

The invention provides a positioning control device which a user can easily operate. Furthermore, this device is extremely effective for control of a linear motor which requires a high feeding speed and highly accurate positioning.

What is claimed is:

1. A dynamic optimizing method for speed data used for preparing a speed instruction pattern fed to a servo motor in a positioning device, comprising:

calculating a desired speed pattern when a moving distance, speed, acceleration time and deceleration time are inputted; and specifying a speed pattern preparation cycle by a user and shifting a decimal part of the speed data right or left to prevent a maximum value of the speed data and a minimum resolution of the speed data from being changed.

2. The dynamic optimizing method for speed data according to claim 1, further comprising selecting a combination of the maximum value and the minimum resolution of the speed data by the user.

3. A positioning device using a servo motor, comprising:

a moving instruction input unit inputting a moving instruction;

a speed pattern preparation cycle unit inputting a speed pattern preparation cycle specified by a user and shifting a decimal part of the speed data right or left to prevent a maximum value of speed data and a minimum resolution of the speed data from being changed;

a speed pattern preparation unit preparing a speed instruction pattern based on the moving instruction, the speed data, and the speed pattern preparation cycle;

a speed instruction unit outputting a speed instruction per cycle based on the speed instruction pattern from the speed pattern preparation unit; and a servo control unit driving the servo motor based on the speed instruction from the speed instruction unit.

* * * * *